(12) United States Patent
Stanescu et al.

(10) Patent No.: US 9,344,180 B2
(45) Date of Patent: May 17, 2016

(54) ANTENNA-DIVERSITY RECEIVER AND METHOD OF OPERATING AN ANTENNA-DIVERSITY RECEIVER AND A TRANSMITTER IN A FREQUENCY-HOPPING COMMUNICATION SYSTEM

(71) Applicants: Razvan-Tudor Stanescu, Bucharest (RO); Florin-Catalin Toma, Ramnicu Valcea (RO)

(72) Inventors: Razvan-Tudor Stanescu, Bucharest (RO); Florin-Catalin Toma, Ramnicu Valcea (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/528,567

(22) Filed: Oct. 30, 2014

(65) Prior Publication Data

US 2016/0065295 A1 Mar. 3, 2016

(30) Foreign Application Priority Data

Aug. 29, 2014 (RO) .................................. 2014 00661

(51) Int. Cl.
*H04Q 11/00* (2006.01)
*H04L 12/50* (2006.01)
(Continued)

(52) U.S. Cl.
CPC ............ *H04B 7/0814* (2013.01); *H04B 1/7156* (2013.01); *H04B 7/12* (2013.01); *H04B 17/29* (2015.01); *H04B 2001/71563* (2013.01)

(58) Field of Classification Search
USPC ......... 375/219, 220, 221, 222, 259, 260, 285, 375/278, 275, 286, 288, 295, 315, 316, 340, 375/345, 346, 349, 339, 338, 358; 370/276, 370/277, 279, 282, 287, 289, 310, 334, 330, 370/360, 369, 386, 422, 437, 442, 537, 538, 370/539, 540, 541
See application file for complete search history.

(56) References Cited

U.S. PATENT DOCUMENTS 6,871,052 B2    3/2005   Spencer et al.
8,428,538 B2 *   4/2013   Huebner ............. H04L 25/0232
                                                            455/226.1

(Continued)

FOREIGN PATENT DOCUMENTS

EP           2106037 A2    9/2009
NL    WO 02098018 A1 * 12/2002          H04B 7/0808

(Continued)

OTHER PUBLICATIONS

"Bluetooth Specification Version 2.0 + EDR. Baseband specification." Nov. 14, 2004, pp. 56-152, http://www.bluetooth.org.

(Continued)

*Primary Examiner* — Linda Wong

(57) ABSTRACT

An antenna-diversity receiver receives data units from a transmitter in a frequency-hopping communication system. The frequency-hopping system has a channel set comprising of multiple channels, each having its own frequency range. The channel set comprises a set of multiple advertising channels and a set of multiple data channels. The receiver comprises an antenna set of multiple antennas.

The transmitter has an advertising mode in which the transmitter transmits an advertising signal and switches from one advertising channel to another advertising channel in accordance with a sequence of advertising intervals, each advertising interval comprising an advertising packet.

The receiver has an antenna sampling mode in which the receiver receives, successively for each combination of antenna and advertising channel, advertising packets. The receiver determines a corresponding signal quality value and selects, for each data channel, an antenna from the antenna set on the basis of the determined signal quality values.

20 Claims, 5 Drawing Sheets

(51) Int. Cl.
  *H04B 7/08* (2006.01)
  *H04B 1/7156* (2011.01)
  *H04B 7/12* (2006.01)
  *H04B 17/29* (2015.01)

(56) References Cited

U.S. PATENT DOCUMENTS

| | | | |
|---|---|---|---|
| 8,824,526 B2 * | 9/2014 | Adler | H04B 7/0822 375/148 |
| 2002/0118724 A1 | 8/2002 | Kishimoto et al. | |
| 2009/0010311 A1 | 1/2009 | Collier et al. | |
| 2009/0262786 A1 | 10/2009 | Hammersley | |
| 2012/0087431 A1 * | 4/2012 | Liu | H04B 7/0874 375/267 |
| 2012/0113928 A1 * | 5/2012 | Hwang | H03M 13/27 370/329 |
| 2012/0275499 A1 * | 11/2012 | Anreddy | H04B 7/04 375/219 |
| 2013/0315050 A1 * | 11/2013 | Zhang | H04B 7/0417 370/203 |

FOREIGN PATENT DOCUMENTS

WO    02/098018 A1    12/2002
WO    WO 02098018 A1 *  12/2002

OTHER PUBLICATIONS

Gomez et al, "Overview and Evaluation of Bluetooth Low Energy: An Emerging Low-Power Wireless Technology." Dec. 29, 2012, pp. 11734-11753, ISSN: 1424-8220.

EP Search Report, dated Jan. 22, 2016, for European Application No. 15182117.0, 11 pages.

* cited by examiner

ANTENNA-DIVERSITY RECEIVER AND METHOD OF OPERATING AN ANTENNA-DIVERSITY RECEIVER AND A TRANSMITTER IN A FREQUENCY-HOPPING COMMUNICATION SYSTEM

CROSS REFERENCE TO RELATED APPLICATION(S)

The present application claims priority to Romanian Patent Application No. RO A 2014 00661, entitled "ANTENNA-DIVERSITY RECEIVER AND METHOD OF OPERATING AN ANTENNA-DIVERSITY RECEIVER AND A TRANSMITTER IN A FREQUENCY-HOPPING COMMUNICATION SYSTEM," filed on Aug. 29, 2014, the entirety of which is herein incorporated by reference.

FIELD OF THE INVENTION

This invention relates to an antenna-diversity receiver and to a method of operating an antenna-diversity receiver and a transmitter in a frequency-hopping communication system.

BACKGROUND OF THE INVENTION

Frequency-hopping communication systems, such as a Bluetooth or IEEE 082.15.4e-2012 compliant system, supporting antenna diversity typically use an antenna selection scheme in which the active antenna is selected for each new data packet. More specifically, signal quality values from the multiple antennas may be sampled while receiving the preamble of the data packet in question. To this end, each of the multiple antennas may be operated to receive at least part of the preamble and a corresponding signal quality value may be determined. The antenna with the best signal quality value may then be chosen as the active antenna for receiving the rest of the data packet, notably, for receiving the payload of the data packet. This approach requires the preamble to be sufficiently long to allow selecting the active antenna during reception of the preamble. It may fail if the preamble is too short.

SUMMARY OF THE INVENTION

The present invention provides a receiver, a frequency hopping system, and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
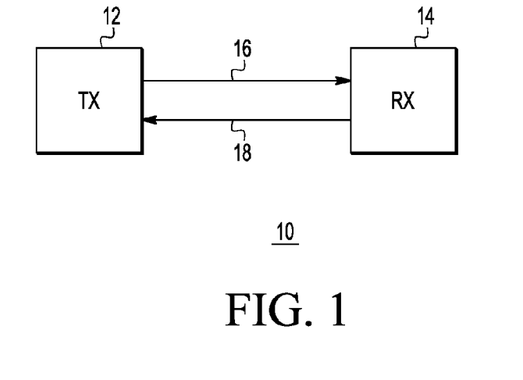
FIG. 1 schematically shows a block diagram of an example of an embodiment of a frequency-hopping communication system.

FIG. 1 schematically shows an example of a frequency-hopping communication system 10, such as a Bluetooth or IEEE 082.15.4e-2012 compliant system. The system comprises a transmitter 12 and a receiver 14. The communication system 10 may comprise further transmitters and further receivers (not shown). In operation, the transmitter 12 transmits a radio frequency (RF) signal 16, which is received by the receiver 14. The receiver 14 may, in turn, transmit a radio frequency signal 18 which may be received by the transmitter 12. The RF signals 16 and 18 may be narrow-band signals with frequencies that are altered in accordance with a frequency-hopping scheme. For example, a carrier frequency of the RF signal 16 may be changed periodically from one value to another different value. A risk of interference with other electronic devices, e.g., devices external to the communication system 10, may thus be reduced.

In one example of a frequency-hopping scheme, the transmitter 12 transmits information in the form of packets modulated on a carrier wave of the RF signal 16. The carrier frequency of the RF signal 16 may be set to a new value, i.e., to a frequency value different from a current frequency value, at regular or irregular intervals, such as with the start of each new interval. For instance, the frequency-hopping scheme may have a fixed or configurable channel set. The channel set may comprise of two or more channels, wherein each channel has its own distinct carrier frequency. Thus, a frequency-hop may be equivalent to switching from one channel to another channel of the channel set.

The receiver 14 may be an antenna-diversity receiver. An antenna-diversity receiver has multiple antennas, i.e., two or more antennas, and a switch for selecting one of the antennas as an active antenna and circuitry for using effectively only the active antenna as a reception antenna. In other words, only the output from the active antenna is used while the output from the one or more other antennas of the receiver may be ignored. The switch for selecting the active antenna may be arranged at various positions of the reception path, depending on the particular implementation. For instance, the switch may have multiple inputs connected directly to the multiple antennas and an output connected to, e.g., a down-converter, e.g., a mixer. In another example, the receiver comprises one down-converter per antenna and the switch is located downstream of the multiple down-converters.

In one example of a frequency-hopping communication system 10, the transmitter 12 has a data transmission mode in which the RF signal 16 conveys a sequence of data packets while performing frequency-hopping over multiple data channels. The data packets are also referred to as data units, protocol data units, or payload data units. Each data packet may comprise a preamble and a payload. The preamble may, for instance, enable the receiver 14 to synchronize with the transmitter 12, or to identify the beginning of each newly received data packet. The payload may contain the actual data that is to be transmitted to the receiver 14 and which may be intended to be further processed, memorized, analyzed or otherwise used.

Figure 2:
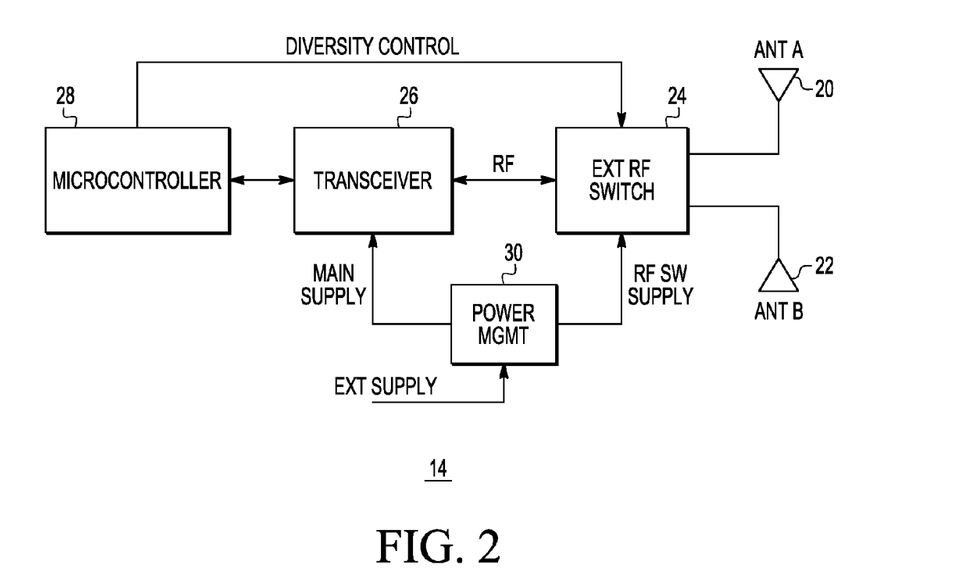
FIG. 2 schematically shows a block diagram of an example of an antenna diversity receiver.

FIG. 2 shows a receiver 14 as may be used in the frequency-hopping communication system. As shown in the example of FIG. 2, the receiver 14 may comprise an antenna set 20, 22, an antenna switch 24, a transceiver unit 26, and a control unit 28. Although in the following the receiver 14 is described as having all of those elements, it will be apparent that the receiver may be implemented with only some of the elements, such as without the antenna set and/or the antenna switch 24 but connectable thereto. As shown, the receiver 14 may further comprise a power management unit 30 for powering the receiver 14, or components thereof.

The transceiver unit 26 may be operable to operate alternatively as a receiver unit and as a transmitter unit. In other words, the transceiver unit 26 may have a first operating mode in which it receives a radio frequency signal from one of the antennas 20, 22 via the switch 24, and a second operating mode in which the transceiver unit 26 drives one of the antennas 20, 22 via the switch 24 to transmit a radio frequency signal, e.g., to the transmitter unit 12. These two operating modes are termed a receive mode and a transmit mode, respectively.

The control unit 28, e.g. a microcontroller or other type of microprocessor, may be arranged to control the switch 24 so as to select one of the antennas 20 and 22 as an active antenna. More specifically, the switch 24 may be arranged to connect the selected antenna through to the transceiver unit 26 and to disconnect the other antennas, e.g., the antenna 22, from the transceiver unit 26. The active antenna may be selected, e.g., by the control unit 28, in dependence of signal quality values measured individually for each antenna for each channel. For instance, when the antenna 20 yields a better signal quality, for a certain channel, than the antenna 22, the control unit 28 may select the antenna 20 as the active antenna by means of the switch 24. In a variant (not shown) of the example, the antenna set comprises more than two antennas.

A transmitter transmitting to the receiver unit 14, e.g., the transmitter 12 shown in FIG. 1, may have an advertising mode and a data transmission mode. In the advertising mode, the transmitter may transmit an advertising signal for enabling devices in its environment to detect its presence and for enabling them to establish a communication link with the transmitter unit in accordance with a communication protocol, e.g., Bluetooth. The process of establishing a communication link between a transmitter and a receiver is also referred to as connecting the receiver to the transmitter, although the communication link may be a wireless link. When the transmitter 12 is in the advertising mode, the receiver 14 may thus connect to the transmitter 12, e.g., by an exchange of information in accordance with the communication protocol. Such exchange of information for connecting a receiver to a transmitter is referred to as a handshake.

When the receiver 14 has connected to the transmitter 12, the transmitter 12 may switch from the advertising mode to its data transmission mode. In the data transmission mode, the transmitter 12 may transmit a data signal to the receiver unit 14. The data signal may include payload data. In both modes, i.e., in the advertising mode as well as in the data transmission mode, the transmitter 12 may perform frequency-hopping. That is, the transmitter 12 may change its carrier frequency at certain times, e.g., periodically or after transmitting a certain number of bits. In other words, the transmitter may be arranged to switch from one channel to another channel in accordance with a sequence of channel use intervals. A channel use interval, also referred to as a dwell time, or simply as an interval, is a period during which the transmitter stays on a certain channel. The channel use intervals may all have the same length. Depending on the implementation, this length may be a duration of the respective channel use interval, or a number of bits or packets contained in the channel use interval. In another implementation, some intervals may be longer or shorter than others.

Since the selection of an antenna for receiving a data packet is based on signal quality values determined during an earlier phase, namely during the advertising phase, which precedes the data transmission phase the challenges associated with selecting an antenna testing the available antennas on the basis of a preamble of the same data packet can be obviated, as will be described in greater detail by making additional reference to FIGS. 3 to 9.

Figure 3:
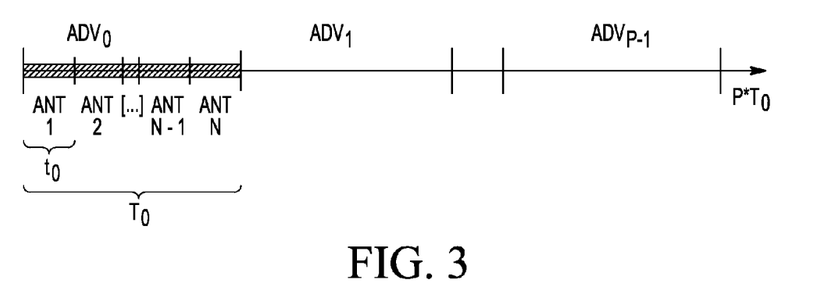
FIG. 3 schematically shows a timing diagram of an example of a sequence of advertising units.

FIG. 3 schematically illustrates a first example of an advertising phase in which the transmitter 12 transmits an advertising signal. In the example, the transmitter 12 transmits successively on advertising channels numbered 0 to P−1. P is the total number of advertising channels used in this example of a frequency-hopping scheme. During an advertising interval $Adv_0$ the transmitter may transmit on advertising channel 0. During a next advertising interval $Adv_1$, the transmitter 12 may transmit on advertising channel 1, and so on. The advertising interval $Adv_{P-1}$ may be succeeded by an advertising interval $Adv_P$ (not shown) during which the transmitter 12 again transmits on advertising channel 0. In other words, the sequence of advertising channels used by the transmitter 12 may be periodic. However, non-periodic schemes (not shown) may be used as well. Non-periodic schemes may provide a higher level of data security as they may render the transmitted signal more difficult to decode for a third party.

Each advertising interval $Adv_i$ (i=0, 1, 2, . . . ) may comprise one or more advertising packets. An advertising packet may be a finite bit sequence, i.e., a bit string, that does not contain any payload data but may serve to advertise the transmitter's presence to other devices, e.g., to the receiver 14. For instance, an advertising packet may contain information about the transmitter 12, e.g., an identifier of the transmitter 12 or a specification of a type of device. Each advertising interval may comprise precisely M advertising packets. Each advertising packet may have a duration $t_0$. The duration of each advertising interval may thus be $T_0=M*t_0$. In the shown example, M=N, i.e., the number of advertising packets in each advertising interval may match the number of antennas. This may be achieved for example by configuring the transmitter appropriately in dependence of a control signal from the receiver 14. For instance, the transmitter 12 may be arranged to set the total number of advertising packets M transmitted in each advertising interval equal to the total number of available antennas N of the receiver 14 in response to, e.g., a request from the receiver 14. Alternatively, a user (not shown) may configure the transmitter 12 such that the number of advertising packets per advertising interval matches the number N of antennas. With M=N a particularly simple and easily implementable antenna sampling scheme may be achieved.

While the transmitter 12 is in the advertising mode, the receiver 14 may be operated in an antenna sampling mode in which the receiver 14 receives, successively for each combination of an antenna of its antenna set and an advertising channel of the P advertising channels, one or more advertising packets to determine a corresponding signal quality value.

More specifically, antenna n may be selected to receive advertising packet m of advertising interval p and the corresponding signal quality value Q (n, p) may be determined, wherein n runs from 1 to N and p runs from 0 to P−1.

Figure 4:
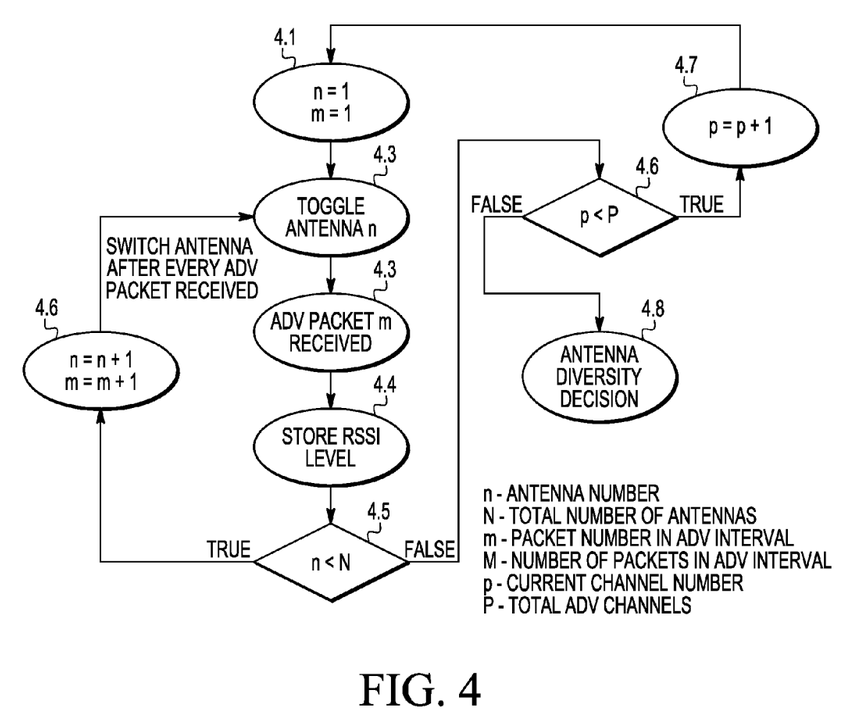
FIG. 4 schematically shows a flowchart of an example of an embodiment of an antenna sampling mode.

An example of a workflow of the method described above in reference to FIG. 3 is represented in FIG. 4. In the example, n is the antenna number, i.e., an antenna identifier, N is the total number of antennas, m is the packet number in an advertising interval, M is the total number of packets in an advertising interval, p is a current channel number, and P is the total number of advertising channels. The method may start with activating the first antenna, i.e., antenna number n=1 and operating the first antenna to receive the first packet (m=1) in an advertising interval (4.1, 4.2, 4.3). A corresponding signal quality value, e.g., an RSSI level, may be determined and stored (4.4), e.g., by the control unit 28 (see FIG. 2). If n<N, n and m may each be incremented by 1 and antenna number n may be toggled, i.e., activated (4.2). Advertising packet m may be received (4.3) and a corresponding signal quality level (4.4) may be determined and stored (4.4). If however, n≥N (4.5), and if p<P, p may be incremented by 1 (4.7) and the process flow may return to box 4.1. If however p≥P (4.6), an antenna diversity decision may be made.

The antenna diversity decision may comprise assigning one antenna of the antenna set to each data channel in the channel set on the basis of the signal quality values determined during the advertising phase. To this end, signal quality values determined for advertising channels may be extrapolated to generate extrapolated signal quality values for a data channel if the data channel is not identical to one of the advertising channels. Alternatively, for a data channel which is not identical to one of the advertising channels, an antenna may be chosen on the basis of the signal quality values of an advertising channel which is nearest in frequency to the respective data channel. For instance, if among all advertising channels, advertising channel number 3 is nearest in frequency to data channel number 5 and antenna number 2 has, among all antennas, the best signal quality value for advertising channel 3, antenna number 2 may be assigned to data channel number 5.

Figure 5:
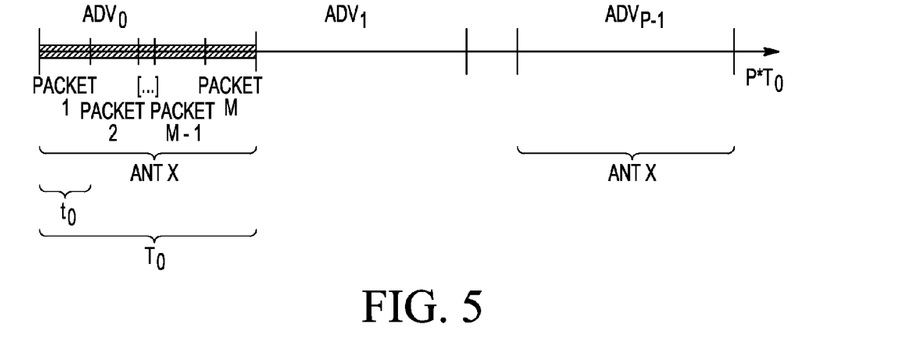
FIG. 5 schematically shows a timing diagram of an example of a sequence of advertising packets.

Referring now to FIG. 5, another example of an antenna sampling scheme is described. This scheme may be particularly suitable when the total number of available antennas N is greater than the maximum number of advertising packets that can be accommodated in a single advertising interval. The N available antennas may be tested one after the other in a sequence of N test phases. In each test phase, another one of the available antennas may be selected as the active antenna to receive a sequence of P successive advertising intervals. From the signal delivered by the active antenna n for each advertising interval p, a corresponding signal quality value Q(n,p), e.g., an RSSI level may be determined and stored. After the sequence of P successive advertising intervals, when a signal quality value has been determined for each of the P advertising channels for the active antenna, the active antenna may be deactivated and another one of the antennas may be activated for the next P successive advertising intervals. A set of N*P signal quality values Q(n,p), namely, one signal quality value per antenna per channel, may thus be derived from N*P successive advertising intervals.

Figure 6:
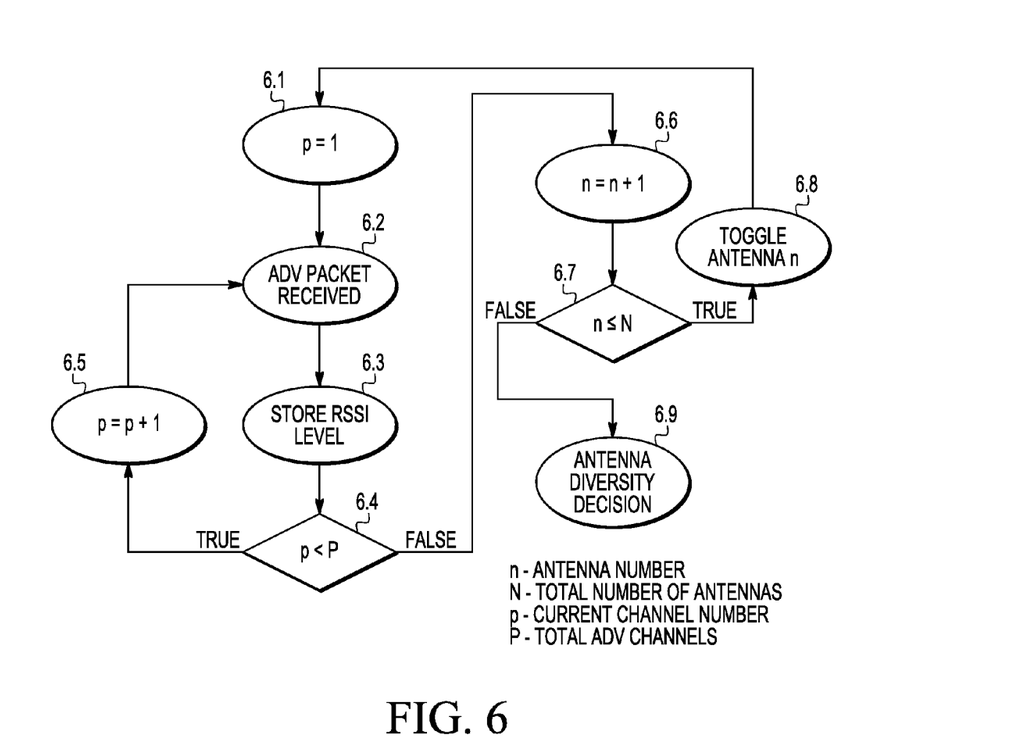
FIG. 6 schematically shows a flowchart of an example of a flowchart of an example of an embodiment of an antenna sampling mode.

An example of the method described above with reference to FIG. 5 is further illustrated by the flowchart in FIG. 6. In the flowchart n is the antenna number, N is the total number of antennas, p is a current channel number, and P is the total number of advertising channels. The method may start with setting p=1 (6.1). The currently active antenna may then receive an advertising packet (6.2) from the transmitter 12.

The receiver 14 may then determine and store a corresponding signal quality value, e.g., an RSSI level (6.3). If p<P (6.4), the receiver 12 may set p=P+1 (6.5) and return to box 6.2 to receive the next advertising packet. If however, p≥P, the receiver may set n=n+1 (6.6) and, if n≤N (6.7), toggle antenna number n (6.8), thus deactivating the currently active antenna and activating antenna n. The process 6.1 to 6.8 may then be repeated with p=1 and the newly activated antenna n. If however, n≤N (6.7), an antenna diversity decision (6.9) may be made for each data channel to assign one of the antennas to the respective data channel on the basis of the signal quality values determined on the basis of received advertising packets. This method may be particularly efficient if there is only one advertising packet in each advertising interval, considering that one advertising packet may be sufficient for determining a signal quality value. The antennas may be assigned to the data channels on the basis of the signal quality values determined for receiving the advertising channels in the same manner as described above with reference to FIGS. 3 and 4. The method can thus be used even when the data channels differ from the advertising channels.

Figure 7:
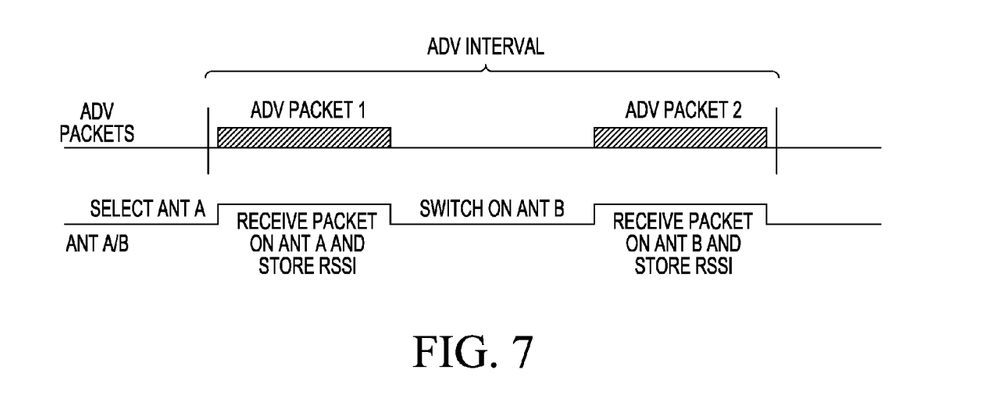
FIG. 7 schematically shows a timing diagram of an example of a sequence of advertising units and a corresponding antenna toggling sequence.

FIG. 7 schematically illustrates an example in which the antenna diversity receiver 12 has only two antennas to select from, e.g., the first antenna 20 and the second antenna 22 (see FIG. 2). In the example, an advertising interval comprises a first advertising packet and a later second advertising packet. The first antenna (ANT A, n=1) may be activated to receive the first advertising packet and the receiver may determine and store a corresponding signal quality value Q(1, 1). The second antenna (ANT B, n=2) may then be activated to receive the second data packet and the receiver may determine and store a corresponding signal quality value Q(2, 1). These operations may be repeated similarly for a next advertising interval to determine signal quality values Q(1, 2), Q(2, 2) for the two antennas for the advertising channel of the next advertising interval (p=2).

Figure 8:
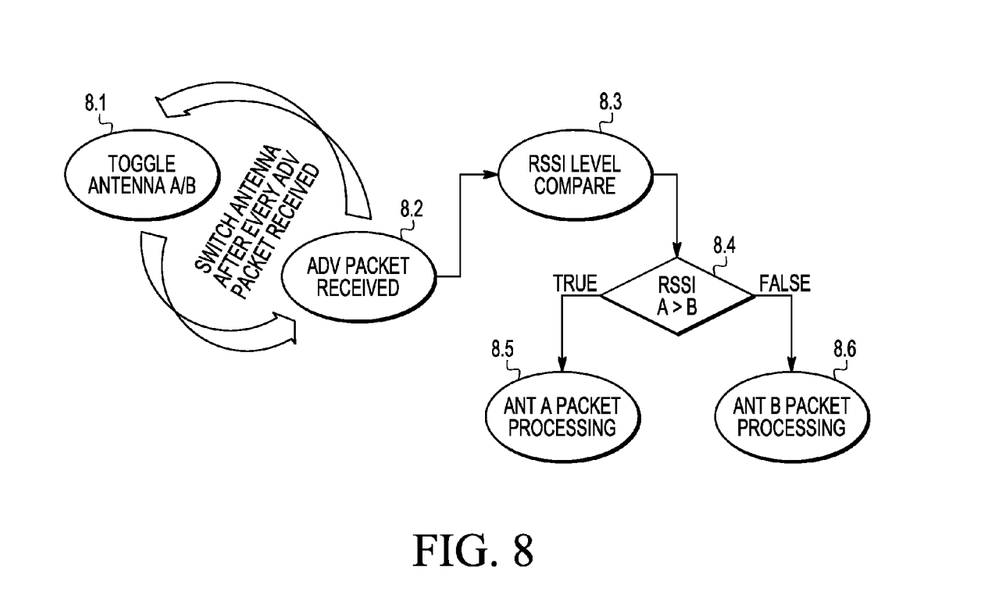
FIG. 8 schematically shows a flowchart of an example of an embodiment of an antenna sampling mode.

An example of the method described above in reference to FIG. 7 is further illustrated by the flowchart in FIG. 8. After receiving an advertising packet by the currently active antenna (8.2), the antennas, e.g., antennas A and B, may be toggled, that is, the active antenna may be deactivated and the inactive antenna may be activated (8.1). For each received advertising packet, a corresponding signal quality value may be determined. When a signal quality value Q(n, p) has been determined for each possible pair (n, p) of antenna (n) and advertising channel (p) (forming a total of 2*P signal quality values), the signal quality values for a given advertising channel may be compared (8.3) and one of the two antennas may be assigned to the respective advertising channel accordingly. For example, assuming that for a given advertising channel, antenna A has the better signal quality value, e.g., a higher RSSI level (8.4), antenna A may be assigned to the respective advertising channel (8.5) or to a data channel which is close in frequency to the respective advertising channel. Similarly, if antenna B has the better signal quality value for the respective advertising channel (8.4), antenna B may be assigned to the respective advertising channel (8.6) or to a data channel that is close in frequency to the respective advertising channel.

Figure 9:
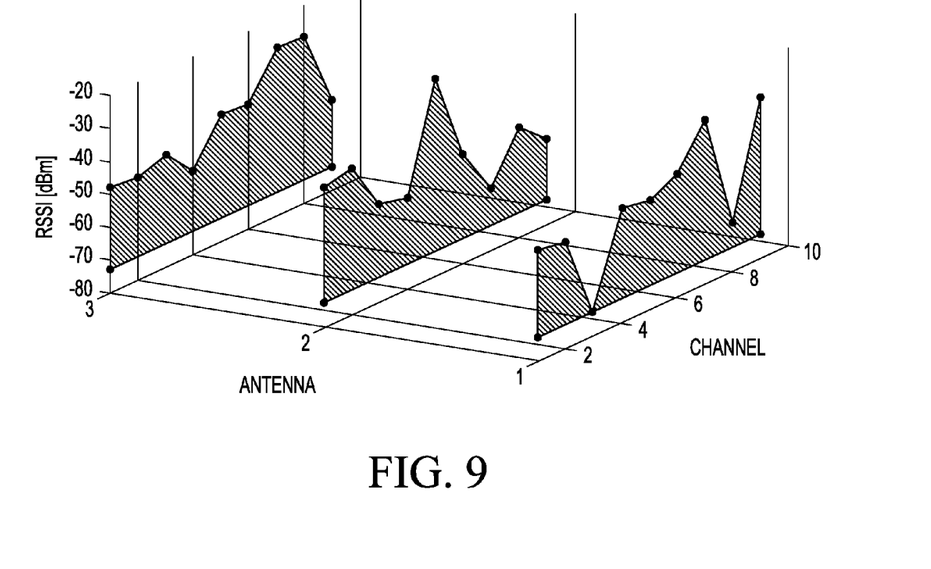
FIG. 9 schematically shows a three-dimensional graph of measured RSSI values as a function of channel and antenna.

The graph in FIG. 9 illustrates an example of a set of N*P RSSI levels, wherein N=3 and P=10. For each combination of an antenna value n and a channel value p, a corresponding RSSI level RSSI(n,p) is represented by a vertical offset.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the control unit 28 and the transceiver unit 26 may be merged.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, an antenna diversity decision may be made each time one of the signal quality values is updated.

Also for example, in one embodiment, the illustrated examples may be implemented as circuitry located on a single integrated circuit or within a same device. For example, the switch 24, the transceiver unit 26, and the microcontroller unit 28 may be implemented as a single integrated circuit. Alternatively, the examples may be implemented as any number of separate integrated circuits or separate devices interconnected with each other in a suitable manner. For example, the transceiver unit 26 and the microcontroller unit 28 may be implemented as separate integrated circuits.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An antenna-diversity receiver for receiving data units from a transmitter in a frequency-hopping communication system having a channel set comprising of two or more channels, each channel having a respective frequency range of a plurality of frequency ranges, the transmitter having an advertising mode in which the transmitter transmits an advertising signal and switches from one advertising channel to another advertising channel in accordance with a sequence of advertising intervals, each advertising interval comprising one or more advertising packets; and the channel set comprising a set of two or more advertising channels and a set of two or more data channels,     the receiver being connectable to an antenna set comprising of two or more antennas;

the receiver having an antenna sampling mode in which the receiver receives, successively for each combination of an antenna of the antenna set and an advertising channel of the set of advertising channels, one or more advertising packets on the respective advertising channel of the set of advertising channels using the respective antenna of the antenna set and determines a corresponding signal quality value;

wherein the receiver is arranged to select, for each data channel, a respective antenna on the basis of the determined signal quality values, and     wherein the receiver is arranged to prompt the transmitter to switch to the advertising mode in response to detecting that one or more of antennas of the antenna set have an insufficient received signal strength indicator (RSSI) level in a data reception mode.

2. The receiver of claim 1, wherein the transmitter has a data transmission mode in which the transmitter transmits a data signal and switches from one data channel to another data channel in accordance with a sequence of data intervals, wherein each data interval comprises one or more data packets, and wherein the receiver has a data reception mode in which the receiver receives the data signal, by choosing for each data interval the antenna assigned to the corresponding data channel.

3. The receiver of claim 1, wherein the receiver, when in the antenna sampling mode, is arranged to switch to another antenna with each advertising packet.

4. The receiver of claim 3, wherein each advertising interval comprises a total of M advertising packets per advertising interval, wherein M is equal to or greater than the total number N of antennas in the antenna set, M and N are integers.

5. The receiver of claim 1, wherein the receiver, when in the antenna sampling mode, is arranged to switch to a first antenna and to determine a first set of signal quality values for the first antenna on the basis of a first sequence of advertising intervals before switching to a next antenna.

6. The receiver of claim 5, wherein the first sequence of advertising intervals comprises an advertising interval for each advertising channel and the first set of signal quality values comprises a signal quality value for each advertising channel.

7. The receiver of claim 6, wherein the total number M of advertising packets in each advertising interval is less than the total number N of antennas in the antenna set, M and N are integers.

8. The receiver of claim 5, wherein the total number M of advertising packets in each advertising interval is less than the total number N of antennas in the antenna set, M and N are integers.

9. The receiver of claim 1, wherein the set of advertising channels and the set of data channels are disjoint, overlapping, or identical.

10. The receiver of claim 1, arranged to carry out said action of selecting, for each data channel, an antenna by:
selecting the antenna on the basis of the signal quality value of an advertising channel which is nearest in frequency to the respective data channel.

11. The receiver of claim 1, wherein the signal quality value is a received signal strength indicator (RSSI) level.

12. The receiver of claim 1, arranged to prompt the transmitter to switch to a data transmission mode when terminating the antenna sampling mode.

13. The receiver of claim 1, wherein the communication system is a Bluetooth system or compliant with IEEE standard 802.15.4e-2012.

14. A frequency hopping system, comprising:
a channel set comprising of two or more channels, each channel having a respective frequency range of a plurality of frequency ranges, the channel set comprising a set of two or more advertising channels and a set of two or more data channels;
a transmitter having an advertising mode in which the transmitter transmits an advertising signal and switches from one advertising channel to another advertising channel in accordance with a sequence of advertising intervals, each advertising interval comprising one or more advertising packets; and
a receiver as claimed in claim 1.

15. A method of operating an antenna-diversity receiver and a transmitter in a frequency-hopping communication system having a channel set comprising of two or more channels, wherein each channel has a respective frequency range of a plurality of frequency ranges, the channel set comprises a set of two or more advertising channels and a set of two or more data channels, the receiver comprises an antenna set comprising of two or more antennas, and the method comprises:
operating the transmitter in an advertising mode in which the transmitter transmits an advertising signal and switches from one advertising channel to another advertising channel in accordance with a sequence of advertising intervals, each advertising interval comprising one or more advertising packets;
operating the receiver in an antenna sampling mode in which the receiver receives, successively for each combination of an antenna from the antenna set and an advertising channel from the set of advertising channels among the antennas and advertising channels, one or more advertising packets on the respective advertising channel of the set of advertising channels using the respective antenna of the antenna set and determines a corresponding signal quality value;
operating the receiver to select, for each data channel, the respective antenna from the antenna set on the basis of the determined signal quality values;
operating the transmitter in a data transmission mode in which the transmitter transmits a data signal and switches from one data channel to another data channel in accordance with a sequence f data intervals, wherein each data interval comprises one or more data packets;
operating the receiver in a data reception mode in which the receiver receives the data signal, comprising for each data interval of the data channel:
choosing the antenna of the antenna set assigned to the data channel of the respective data interval; and
receiving the data interval by the chosen antenna.

16. The method of claim 15, wherein operating the receiver to select, for each data channel, the respective antenna from the antenna set on the basis of the determined signal quality values further comprises:
operating the receiver to select the respective antenna on the basis of a respective determined signal quality value of the determined signal quality values of the respective advertising channel of the set of advertising channels which is nearest in frequency to the corresponding data channel.

17. The method of claim 15, further comprising:
prompting the transmitter to switch to the advertising mode in response to detecting that one or more of data channel antennas have an insufficient received signal strength indicator (RSSI) level in a data reception mode.

18. An antenna-diversity receiver for receiving data units from a transmitter in a frequency-hopping communication system, the transmitter having an advertising mode in which the transmitter transmits an advertising signal and switches from one advertising channel to another advertising channel in accordance with a sequence of advertising intervals, each advertising interval comprising one or more advertising packets; and the channel set comprising a set of two or more advertising channels and a set of two or more data channels,
the receiver being connectable to an antenna set comprising of two or more antennas;
the receiver having an antenna sampling mode in which the receiver receives, successively for each combination of an antenna of the antenna set and an advertising channel of the set of advertising channels, one or more advertising packets on the respective advertising channel of the set of advertising channels using the respective antenna of the antenna set and determines a corresponding signal quality value;

wherein the receiver is arranged to select, for each data channel, a respective antenna on the basis of the corresponding signal quality value of an advertising channel nearest in frequency to the respective data channel.

19. An antenna-diversity receiver for receiving data units from a transmitter in a frequency-hopping communication system having a channel set comprising of two or more channels, each channel having a respective frequency range of a plurality of frequency ranges, the transmitter having an advertising mode in which the transmitter transmits an advertising signal and switches from one advertising channel to another advertising channel in accordance with a sequence of advertising intervals, each advertising interval comprising one or more advertising packets; and the channel set comprising a set of two or more advertising channels and a set of two or more data channels, the receiver being connectable to an antenna set comprising of two or more antennas;

the receiver having an antenna sampling mode in which the receiver receives, successively for each combination of an antenna of the antenna set and an advertising channel of the set of advertising channels, one or more advertising packets on the respective advertising channel of the set of advertising channels using the respective antenna of the antenna set and determines a corresponding signal quality value;

wherein the receiver is arranged to select, for each data channel, a respective antenna on the basis of the determined signal quality values; and wherein the transmitter has a data transmission mode in which the transmitter transmits a data signal and switches from one data channel to another data channel in accordance with a sequence of data intervals, wherein each data interval comprises one or more data packets, and wherein the receiver has a data reception mode in which the receiver receives the data signal, by choosing for each data interval the antenna assigned to the corresponding data channel.

20. An antenna-diversity receiver for receiving data units from a transmitter in a frequency-hopping communication system having a channel set comprising of two or more channels, each channel having a respective frequency range of a plurality of frequency ranges, the transmitter having an advertising mode in which the transmitter transmits an advertising signal and switches from one advertising channel to another advertising channel in accordance with a sequence of advertising intervals, each advertising interval comprising one or more advertising packets; and the channel set comprising a set of two or more advertising channels and a set of two or more data channels, the receiver being connectable to an antenna set comprising of two or more antennas;

the receiver having an antenna sampling mode in which the receiver receives, successively for each combination of an antenna of the antenna set and an advertising channel of the set of advertising channels, one or more advertising packets on the respective advertising channel of the set of advertising channels using the respective antenna of the antenna set and determines a corresponding signal quality value;

wherein the receiver is arranged to select, for each data channel, a respective antenna on the basis of a signal quality value of the determined signal quality values of the advertising channel of the set of advertising channels which is nearest in frequency to the respective data channel.

* * * * *